(12) United States Patent
Hayes et al.

(10) Patent No.: US 10,517,097 B2
(45) Date of Patent: *Dec. 24, 2019

(54) POSITION INFORMATION ASSISTED NETWORK CONTROL

(71) Applicant: SMARTSKY NETWORKS LLC, Charlotte, NC (US)

(72) Inventors: Gerard James Hayes, Wake Forest, NC (US); Elbert Stanford Eskridge, Jr., Chapel Hill, NC (US); Koichiro Takamizawa, Silver Spring, MD (US)

(73) Assignee: Smartsky Networks LLC, Morrisville, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/237,839

(22) Filed: Jan. 2, 2019

(65) Prior Publication Data
US 2019/0159192 A1    May 23, 2019

Related U.S. Application Data

(63) Continuation of application No. 15/867,013, filed on Jan. 10, 2018, now Pat. No. 10,187,896, which is a
(Continued)

(51) Int. Cl.
*H04M 3/00* (2006.01)
*H04W 72/04* (2009.01)
(Continued)

(52) U.S. Cl.
CPC ...... *H04W 72/048* (2013.01); *H04B 7/18506* (2013.01); *H04W 4/027* (2013.01);
(Continued)

(58) Field of Classification Search
CPC ... H04W 72/048; H04W 64/006; H04W 4/02; H04W 36/32; H04W 4/50; H04W 4/027;
(Continued)

(56) References Cited

U.S. PATENT DOCUMENTS

| | | | |
|---|---|---|---|
| 7,379,750 | B2 | 5/2008 | Jalali |
| 7,684,802 | B2 | 3/2010 | Jalali |

(Continued)

FOREIGN PATENT DOCUMENTS

| | | |
|---|---|---|
| EP | 1104211 A2 | 5/2001 |
| EP | 2278732 A2 | 1/2011 |

OTHER PUBLICATIONS

International Search Report and Written Opinion of corresponding International Application No. PCT/US2014/031154 dated Aug. 28, 2014, all enclosed pages cited.

(Continued)

*Primary Examiner* — Amancio Gonzalez
(74) *Attorney, Agent, or Firm* — Burr & Forman LLP

(57) ABSTRACT

A network controller including processing circuitry may be configured to receive dynamic position information indicative of a three dimensional position of at least one mobile communication node, compare fixed position information indicative of fixed geographic locations of respective access points of a network to the dynamic position information to determine a relative position of the at least one mobile communication node relative to at least one of the access points based on the fixed position information and the dynamic position information, and provide network control instructions to at least one network asset based on the relative position.

20 Claims, 4 Drawing Sheets

Related U.S. Application Data continuation of application No. 14/875,956, filed on Oct. 6, 2015, now Pat. No. 9,900,892, which is a continuation of application No. PCT/US2014/031154, filed on Mar. 19, 2014, which is a continuation of application No. 13/859,027, filed on Apr. 9, 2013, now Pat. No. 8,688,101.

(51) Int. Cl.
| | | |
|---|---|---|
| *H04W 4/029* | (2018.01) | |
| *H04W 4/44* | (2018.01) | |
| *H04W 4/04* | (2009.01) | |
| *H04W 64/00* | (2009.01) | |
| *H04W 36/32* | (2009.01) | |
| *H04W 24/02* | (2009.01) | |
| *H04B 7/185* | (2006.01) | |
| *H04W 4/40* | (2018.01) | |
| *H04W 4/02* | (2018.01) | |
| *H04W 4/50* | (2018.01) | |
| *H04W 88/02* | (2009.01) | |
| *H04W 88/08* | (2009.01) | |

(52) U.S. Cl.
CPC .......... *H04W 4/029* (2018.02); *H04W 4/046* (2013.01); *H04W 4/40* (2018.02); *H04W 4/44* (2018.02); *H04W 4/50* (2018.02); *H04W 24/02* (2013.01); *H04W 36/32* (2013.01); *H04W 64/006* (2013.01); *H04W 88/02* (2013.01); *H04W 88/08* (2013.01)

(58) Field of Classification Search
CPC ..... H04W 24/02; H04W 88/02; H04W 88/08; H04B 7/18506
USPC ........................................................ 455/418
See application file for complete search history.

(56) References Cited

U.S. PATENT DOCUMENTS

| | | | |
|---|---|---|---|
| 7,933,599 | B2 | 4/2011 | Fernandez-Corbaton et al. |
| 8,340,663 | B2 | 12/2012 | Tieftrunk et al. |
| 8,700,078 | B2 | 4/2014 | Harada et al. |
| 8,706,131 | B2 | 4/2014 | Winters |
| 10,187,896 | B2 * | 1/2019 | Hayes .................. H04W 4/029 |
| 2003/0069043 | A1 | 4/2003 | Chhaochharia et al. |
| 2003/0193409 | A1 | 10/2003 | Crank |
| 2006/0146731 | A1 | 7/2006 | Lewis et al. |
| 2006/0239238 | A1 | 10/2006 | Fernandez-Corbaton et al. |
| 2010/0067697 | A1 | 3/2010 | Casati et al. |
| 2012/0021740 | A1 | 1/2012 | Vaidyanathan et al. |
| 2012/0202430 | A1 | 8/2012 | Jalali et al. |
| 2014/0078403 | A1 | 3/2014 | Joslyn et al. |

OTHER PUBLICATIONS

Chapter I International Preliminary Report on Patentability of corresponding International Application No. PCT/US2014/031154 dated Oct. 22, 2015, all enclosed pages cited.

Extended European Search Report and Written Opinion of corresponding European application No. 14782133.4, dated May 11, 2016, all enclosed pages cited.

Examination report from corresponding European application No. 14782133.4 dated Feb. 9, 2017, all enclosed pages cited.

Extended European Search Report and Written Opinion of corresponding European application No. 18153645.9, dated Mar. 21, 2018, all enclosed pages cited.

* cited by examiner

POSITION INFORMATION ASSISTED NETWORK CONTROL

CROSS-REFERENCE TO RELATED APPLICATIONS

This application is a continuation of U.S. application Ser. No. 15/867,013 filed Jan. 10, 2018, which is a continuation of U.S. application Ser. No. 14/875,956 filed Oct. 6, 2015 (which issued on Feb. 20, 2018 as U.S. Pat. No. 9,900,892), which is a continuation of International Application number PCT/US2014/031154 filed Mar. 19, 2014, which is a continuation of U.S. application Ser. No. 13/859,027 filed Apr. 9, 2013 (which issued as U.S. Pat. No. 8,688,101 on Apr. 1, 2014). The entire contents of above are incorporated herein by reference.

TECHNICAL FIELD

Example embodiments generally relate to wireless communications and, more particularly, relate to the use of position information to guide the operation of a wireless communication network.

BACKGROUND

High speed data communications and the devices that enable such communications have become ubiquitous in modern society. These devices make many users capable of maintaining nearly continuous connectivity to the Internet and other communication networks. Although these high speed data connections are available through telephone lines, cable modems or other such devices that have a physical wired connection, wireless connections have revolutionized our ability to stay connected without sacrificing mobility.

However, in spite of the familiarity that people have with remaining continuously connected to networks while on the ground, people generally understand that easy and/or cheap connectivity will tend to stop once an aircraft is boarded. Aviation platforms have still not become easily and cheaply connected to communication networks, at least for the passengers onboard. Attempts to stay connected in the air are typically costly and have bandwidth limitations or high latency problems. Moreover, passengers willing to deal with the expense and issues presented by aircraft communication capabilities are often limited to very specific communication modes that are supported by the rigid communication architecture provided on the aircraft.

Conventional ground based communication systems have been developed and matured over the past couple of decades. While advances continue to be made in relation to ground based communication, and one might expect that some of those advances may also be applicable to communication with aviation platforms, the fact that conventional ground based communication involves a two dimensional coverage paradigm and that air-to-ground (ATG) communication is a three dimensional problem means that there is not a direct correlation between the two environments. Instead, many additional factors must be considered in the context of ATG relative to those considered in relation to ground based communication.

BRIEF SUMMARY OF SOME EXAMPLES

One additional factor to consider relative to ATG communication is that the coverage ranges that may be possible to achieve in ATG networks can be vastly larger than the ranges possible for ground based networks. Employing longer range base stations may mean that the networks can be deployed at lower initial cost. However, for optimal network operation, load balancing and interference mitigation must be addressed. Some example embodiments may therefore be provided to enhance the ability of the network to deal with load balancing and interference issues. In this regard, for example, some embodiments may enable a network entity to track a position (which may in some cases include a range and/or a bearing) of every airborne asset within the network, and provide network control instructions on the basis of the known positions and bearings of assets in the network.

In one example embodiment, a network controller is provided. The network controller may include processing circuitry that may be configured to receive dynamic position information indicative of a three dimensional position of at least one mobile communication node, compare fixed position information indicative of fixed geographic locations of respective access points of a network to the dynamic position information to determine a relative position of the at least one mobile communication node relative to at least one of the access points based on the fixed position information and the dynamic position information, and provide network control instructions to at least one network asset based on the relative position.

In another example embodiment, an ATG network is provided. The network may include a plurality of access points and at least one aircraft or other mobile communication node. The network may also include a network controller. The network controller may include processing circuitry that may be configured to receive dynamic position information indicative of a three dimensional position of at least one mobile communication node, compare fixed position information indicative of fixed geographic locations of respective access points of a network to the dynamic position information to determine a relative position of the at least one mobile communication node relative to at least one of the access points based on the fixed position information and the dynamic position information, and provide network control instructions to at least one network asset based on the relative position.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION

Figure 1:
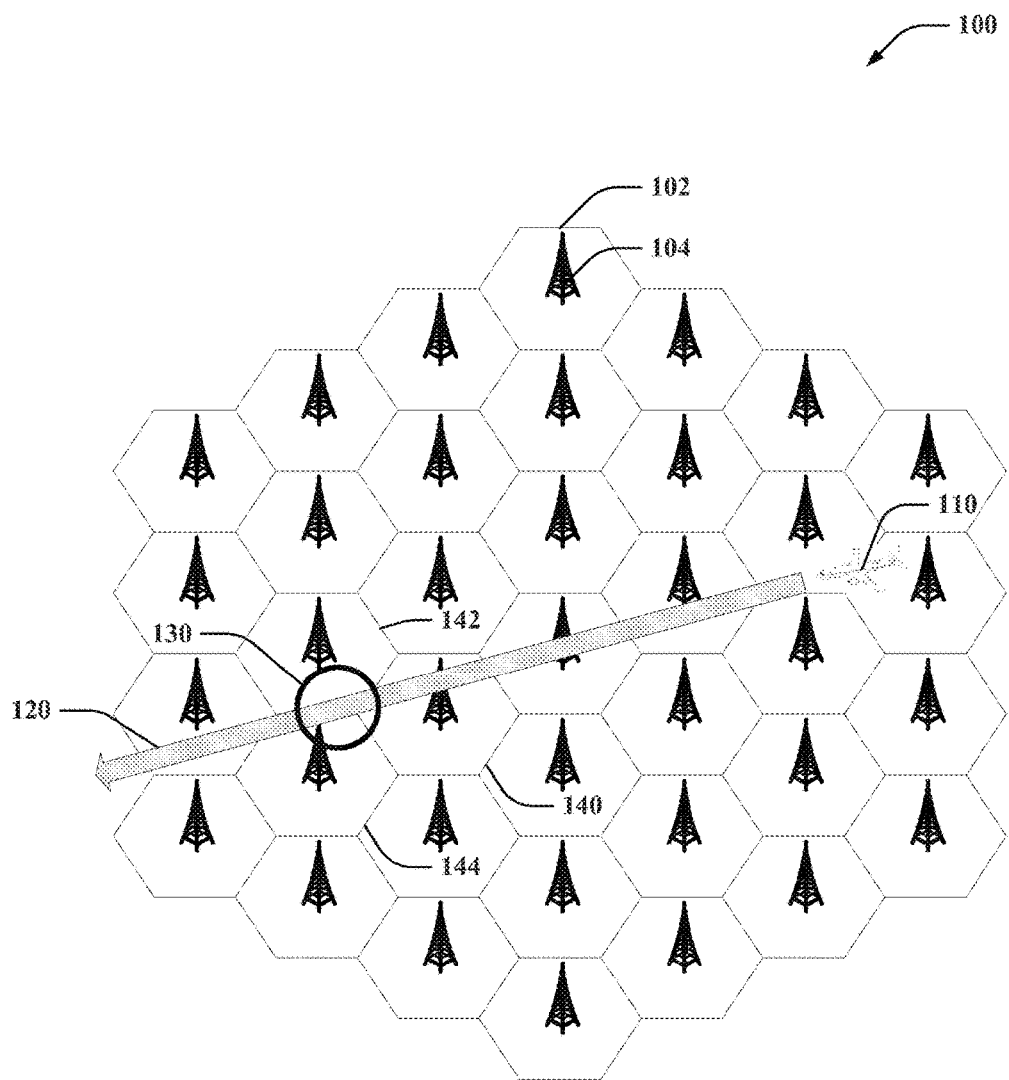
FIG. 1 illustrates an aircraft moving through the coverage areas of different access points over time in accordance with an example embodiment.

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout. Furthermore, as used herein, the term "or" is to be interpreted as a logical operator that results in true whenever one or more of its operands are true. As used herein, the terms "data," "content," "information" and similar terms may be used interchangeably to refer to data capable of being transmitted, received and/or stored in accordance with example embodiments. Thus, use of any such terms should not be taken to limit the spirit and scope of example embodiments.

As used in herein, the terms "component," "module," "system," "device" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of example, both an application running on a computing device and/or the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Artificial intelligence based systems (e.g., explicitly and/or implicitly trained classifiers) can be employed in connection with performing inference and/or probabilistic determinations and/or statistical-based determinations in accordance with one or more aspects of the subject matter as described hereinafter. As used herein, the term "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic that is, the computation of a probability distribution over states of interest based on a consideration of data and events. Inference can also refer to techniques employed for generating higher-level events from a set of events and/or data. Such inference results in the construction of new events or actions from a set of observed events or stored event data, regardless of whether the events are correlated in close temporal proximity, and whether the events and data come from one or several event and data sources. Various classification schemes and/or systems (e.g., support vector machines, neural networks, expert systems, Bayesian belief networks, fuzzy logic, data fusion engines, etc.), for example, can be employed in connection with performing automatic and/or inferred actions in connection with the subject matter.

Thus, for example, some embodiments may provide a network device or system in which a component is provided to use internally or externally derived position information associated with mobile communication nodes within the network (i.e., an aircraft or the communication devices thereon) in order to make inferences and/or probabilistic determinations about where and when such nodes will be most advantageously served by various ones of the base stations of the network. Control signals and functionalities may therefore be generated for control of the base stations and/or for instruction to the communication nodes in order to facilitate efficient operation of the network. Load balancing, antenna beam steering, interference mitigation, network security and/or denial of service functions may therefore be enhanced by the operation of some embodiments.

FIG. 1 illustrates an example layout of a wireless network 100 including multiple cells 102 for providing wireless communication services. The cells 102 can be implemented by one or more access points 104 to facilitate supporting wireless communications within a geographical coverage area of a given cell 102. In this regard, the one or more access points 104 can communicate with one or more wireless communication devices (not shown) present within a respective cell 102. The access points 104 can be assets of one or more existing wireless networks, and/or carriers supporting such networks. Each access point 104 has a wired (or wireless) backhaul connection to the one or more existing wireless networks to allow access thereto for the wireless communications devices connected with the access point 104. Moreover, the access points 104 can be provided via cellular towers or other tower structures (as in the depicted example), rooftops or other structures (e.g. building facades, church steeples, billboards, etc . . . ) having wireless communication infrastructure, mobile vehicles and vessels, and/or the like. Moreover, in existing wireless networks, it is to be appreciated that some cells 102 may overlap or completely encompass one another, and/or coverage gaps may exist between some cells 102, etc., though FIG. 1 shows a deployment of substantially adjacent cells that are deployed to provide continuous coverage over a relatively large area.

It should be appreciated that although the cells 102 of FIG. 1 are shown having a particular shape (i.e., a hexagonal shape), cells of example networks could have any shape depending on terrain and/or building constraints. Moreover, it should also be appreciated that although the access points 104 of FIG. 1 are shown to be positioned substantially in the center of the cells 102 with coverage being provided substantially 360 degrees around each respective one of the access points 104, this structure is not required in all examples. To the contrary, access points 104 could be at cell edges or at any other position within the cells 102, and the cells 102 could take any suitable shape dictated by the radiation patterns and sector coverage deployments of the antennas and antenna arrays provided at each respective one of the access points 104. It should also be appreciated that although the cells 102 are generally depicted to end their respective coverage areas where the corresponding coverage area of an adjacent cell begins, there will typically be some amount of overlap in coverage areas of adjacent cells 102.

In an example embodiment in which the wireless network 100 is an air-to-ground (ATG) network, the access points 104 may be enabled to establish wireless communication links to aircraft 110 or mobile communication nodes disposed thereon. The aircraft 110 can be expected to move through the network 100 in such a way as to require handover between various ones of the access points 104 in order to maintain continuous and uninterrupted communication between the mobile communication node(s) on the aircraft 110 and the network devices to which the backhaul connections couple the access points 104. Given that the cells 102 in an ATG network define three dimensional (3D) coverage areas that extend up to a predetermined altitude, it should therefore also be appreciated that the borders or edges between cells 102 may vary based on altitude. Thus, the borders between cells 102 in FIG. 1 may apply at a particular altitude. However, the borders may be different (or the same) at other altitudes. Thus, unlike a typical terrestrial network, where a change in latitude and longitude coordinates would typically be the driving determiner for which cell 102 the mobile communications nodes of the network select for communication purposes, within the network 100, a handover between cells could be necessitated or desirable merely on the basis of altitude change for a given location in terms of latitude and longitude coordinates.

As shown in FIG. 1, the aircraft 110 may follow a route 120 that causes the aircraft 110 to pass through certain ones of the cells 102. As the aircraft 110 passes through each respective one of the cells 102 along the route 120, the mobile communication node (or nodes) of the aircraft 110 may communicate with the respective 104 access points of the cells 102 along the route 120. However, the communication node (or nodes) of the aircraft 110 may not encounter or ever communicate with a number of the cells 102. In particular, the aircraft 110 may not communicate with cells 102 that are located remotely from the route 120.

Meanwhile, there may also be certain areas along the route 120 at which the aircraft 110 may be in or next two multiple cells 102 at a particular point in time. For example, in overlap region 130, the route 120 carries the aircraft 110 near the intersection of three different cells (e.g., a first cell 140, a second cell 142 and a third cell 144). The route 120 initially has the aircraft 110 completely within the first cell 140. However, the route 120 then carries the aircraft 110 proximate to the second cell 142. In this example, the aircraft 110 may actually spend a short time proximate to edges of the first cell 140, the second cell 142 and the third cell 144 at the same time. Then, the route 120 may provide that the aircraft 110 travels along the edge between the second cell 142 and the third cell 144 for a relatively long period of time.

In some networks, the mobile communication nodes on the aircraft 110 may be configured to request handover based on signal strength changes or the like in order to attempt to maintain continuous and uninterrupted coverage. Alternatively, the access points 104 may communicate with each other and the mobile communication nodes to handle handover decisions based on signal strength or other criteria. Meanwhile, according to some example embodiments, load balancing, antenna beamsteering, and/or interference mitigation (or prevention) may be accomplished by utilizing a network device that is configured to track and/or monitor position information regarding the aircraft 110 (and therefore also the position of the mobile communication nodes thereon) in order to make network control decisions.

In an ATG communications system, the end-user equipment (e.g., wired and wireless routers, mobile phones, laptop computers, on-board entertainment systems, and/or the like) may be installed or otherwise present on the aircraft 110. The user equipment (UE) and any receiving and/or routing device on the aircraft 110 itself may form mobile communication nodes of the wireless netowrk 100. However, as mentioned above, the utilization of position information associated with these mobile communication nodes may not simply involve knowledge of latitude and longitude, relative positioning, global positioning system (GPS) coordinates, and/or the like. Instead, knowledge of 3D position information including altitude and bearing may be required to give an accurate picture of mobile communication location for use in determining which access point 104 is best situated to provide optimum wireless connectivity for the mobile communication nodes. If the UE or the aircraft 110 is installed with a GPS device, Automatic Dependent Surivellance-Broadcast (ADS-B) or other internally or externally derived means of tracking location, speed, and altitude, then this location-specific information may be employed by the wireless system to enhance network control functions to provide load balancing, antenna beamsteering, interference mitigation, network security or recovery from denial of service. For example, the network may be aware of the location (which may be defined by GPS coordinates, range and bearing from a reference point, or the like) of each mobile communication node of the system in the three-dimensional airspace, and the network may therefore further be capable of controlling the frequencies, channels, transmission power, or other activity of the network assets (e.g., mobile communication nodes and/or access points 104) to improve network efficiency and/or performance. In some cases, the network may further determine or access information indicative of the bearing and airspeed of the aircraft 110 and/or the flight plan of the aircraft 110 in order to make predictive or anticipatory control decisions for operation of network assets.

One aspect of some example embodiments may include storage of the wireless network 100 configuration (i.e., the locations of the access points 104 and/or the locations or coverage areas of the cells 102 in terms of 3D space) in reconfigurable memory of a network entity. The network entity, with its knowledge of configuration of the wireless network 100, and further with knowledge of the locations of the various mobile communication nodes, may be configured to assess the best-serving access point from this database and direct initial access requests and handover requests toward the expected best-serving access points. This aspect of some embodiments may enable the network entity to further consider the load on each access point, the risk of interference, or other network performance parameters in making decisions on how to control network assets.

Accordingly, for example, the wireless network 100 of some embodiments may be configured to employ assets and/or equipment to actively track all mobile communication nodes (e.g., all aircraft or UEs in the network) in the 3D airspace. As an example, the aircraft 110 (or devices thereon) taking off from an airport may access and synchronize with a base station near the airport. Once known to the wireless system, the aircraft 110 (or devices thereon) may periodically or continuously transmit position information (e.g., coordinates, altitude, direction and speed) to the serving base station. The base station may share the position information with a centralized server or other device in the core network. The centralized server (or other processing device) may then track, or predict the track for, the aircraft 110 (or devices thereon) and each other aircraft or device in the wireless network 100 in order to compare the network asset location (i.e., dynamic position information) against the database of access point locations of the wireless network 100. The centralized server may then be configured to determine when a particular aircraft (or device thereon) may be moving into or proximate to a different access point's coverage area. The centralized server may then provide instructions to various ones of the network assets to provide load balancing, antenna beamsteering, and/or interference mitigation functions on the basis of the position information. In an example embodiment, the centralized server may be referred to as a network controller for the purposes of explanation of an example embodiment.

Example embodiments may therefore combine knowledge of fixed base station (or access point) positions (e.g., in 2D) with knowledge of moving receiving station positions and/or predictions of future positions (e.g., in 3D) to provide network asset control functions for both the airplane (or devices thereon) and the access points. Improved network efficiency and performance may therefore be maintained within an ATG system, reducing the cost of network coverage and improving both handoff reliability and continuity of network connectivity. The improved efficiency and performance may potentially enable the wireless network 100 to be built with access points that are much farther apart than the typical distance between base stations in a terrestrial network.

Figure 2:
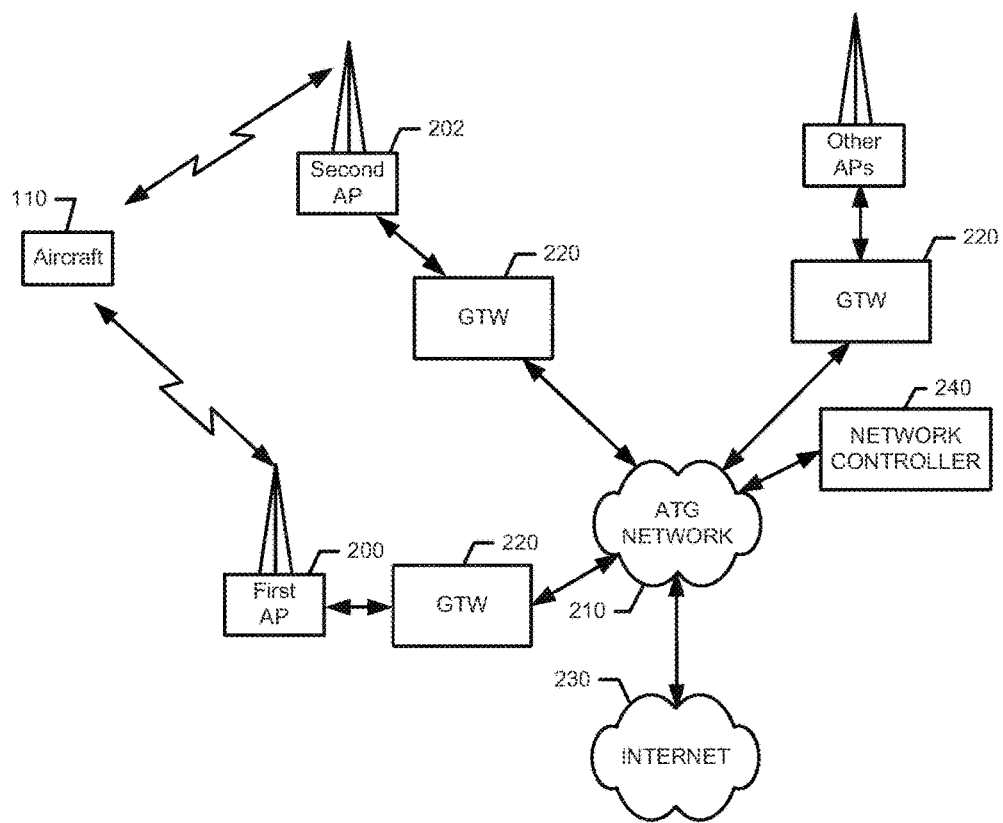
FIG. 2 illustrates a block diagram of a system for employing positional information for assisting with network control in accordance with an example embodiment.

FIG. 2 illustrates a functional block diagram of a network controller for use in an ATG communication network that may employ an example embodiment. As shown in FIG. 2, a first access point 200 and a second access point 202 may each be base stations (e.g., examples of access points 104) of an example embodiment of the wireless network 100, which in this case may be an ATG network 210. The ATG network 210 may further include other access points (APs) as well, and each of the APs may be in communication with the ATG network 210 via a gateway (GTW) device 220. The ATG network 210 may further be in communication with a wide area network such as the Internet 230, Virtual Private Networks (VPNs) or other communication networks. In some embodiments, the ATG network 210 may include or otherwise be coupled to a packet-switched core or other telecommunications network.

In an example embodiment, the ATG network 210 may include a network controller 240 that may include, for example, switching functionality. Thus, for example, the network controller 240 may be configured to handle routing voice, video or data to and from the aircraft 110 (or to mobile communication nodes of or on the aircraft 110) and/or handle other data or communication transfers between the mobile communication nodes of or on the aircraft 110 and the ATG network 210. In some embodiments, the network controller 240 may function to provide a connection to landline trunks when the mobile communication nodes of or on the aircraft 110 is involved in a call. In addition, the network controller 240 may be configured for controlling the forwarding of messages and/or data to and from the mobile communication nodes of or on the aircraft 110, and may also control the forwarding of messages for the access points. It should be noted that although the network controller 240 is shown in the system of FIG. 2, the network controller 240 is merely an exemplary network device and example embodiments are not limited to use in a network employing the network controller 240. Moreover, although the network controller 240 is shown as a part of the ATG network 210 that is ground based, it should be appreciated that the network controller 240 could, in some embodiments, be provided on an aircraft to support aircraft to aircraft communications in a public or private mesh network environment.

The network controller 240 may be coupled to a data network, such as a local area network (LAN), a metropolitan area network (MAN), and/or a wide area network (WAN) (e.g., the Internet 230) and may be directly or indirectly coupled to the data network. In turn, devices such as processing elements (e.g., personal computers, laptop computers, smartphones, server computers or the like) can be coupled to the mobile communication nodes of or on the aircraft 110 via the Internet 230.

Although not every element of every possible embodiment of the ATG network 210 is shown and described herein, it should be appreciated that the mobile communication nodes of or on the aircraft 110 may be coupled to one or more of any of a number of different public or private networks through the ATG network 210. In this regard, the network(s) can be capable of supporting communication in accordance with any one or more of a number of first-generation (1G), second-generation (2G), third-generation (3G), fourth-generation (4G) and/or future mobile communication protocols or the like. In some cases, the communication supported may employ communication links defined using unlicensed band frequencies such as 2.4 GHz or 5.8 GHz.

Figure 3:
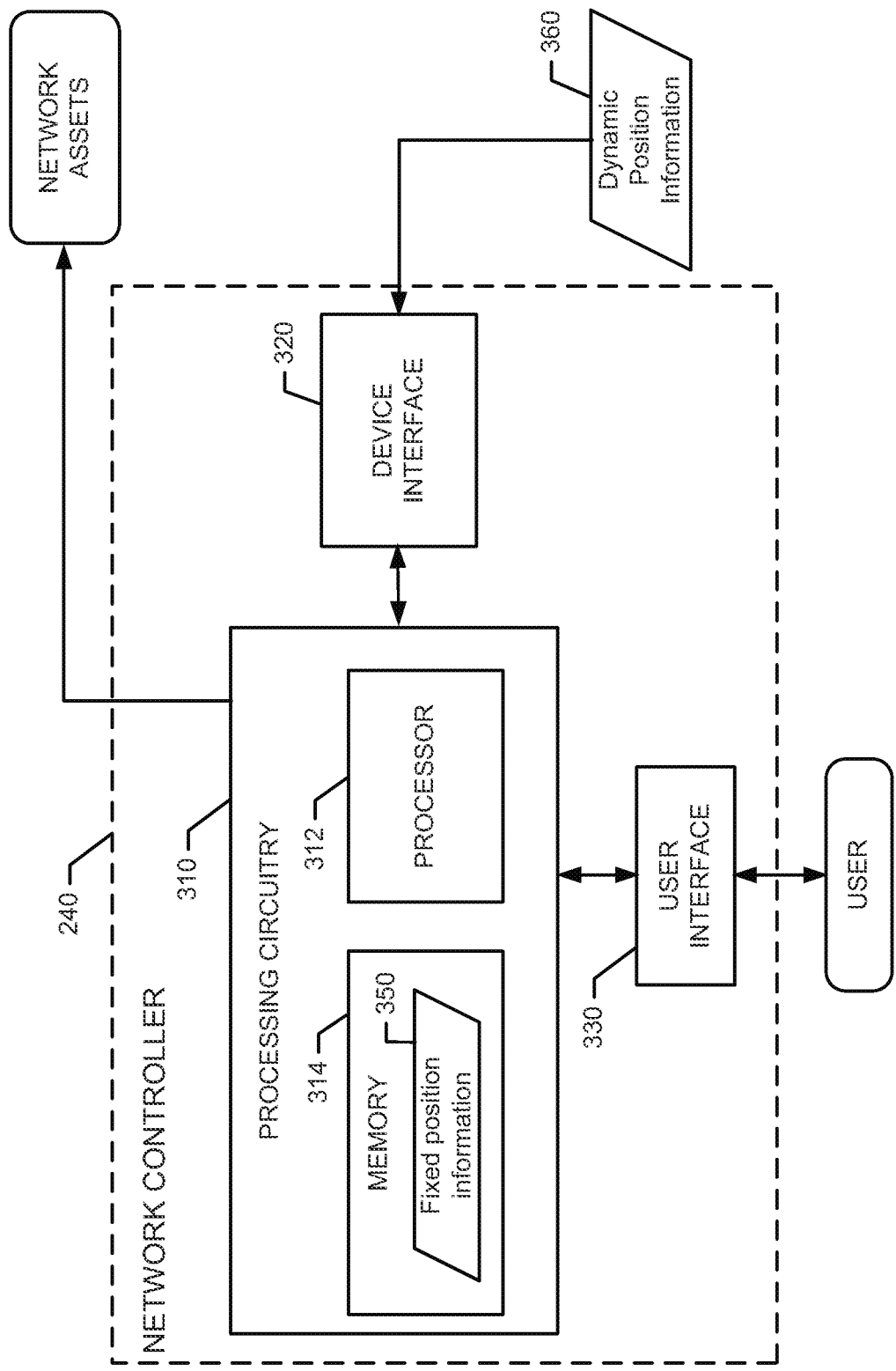
FIG. 3 illustrates control circuitry that may be employed to assist in using positional information for assisting with network control functions according to an example embodiment.

FIG. 3 illustrates one possible architecture for implementation of the network controller 240 in accordance with an example embodiment. The network controller 240 may include processing circuitry 310 configured to provide control outputs for network assets based on processing of various input information including position information of mobile communication nodes of the network. The processing circuitry 310 may be configured to perform data processing, control function execution and/or other processing and management services according to an example embodiment of the present invention. In some embodiments, the processing circuitry 310 may be embodied as a chip or chip set. In other words, the processing circuitry 310 may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The processing circuitry 310 may therefore, in some cases, be configured to implement an embodiment of the present invention on a single chip or as a single "system on a chip." As such, in some cases, a chip or chipset may constitute means for performing one or more operations for providing the functionalities described herein.

In an example embodiment, the processing circuitry 310 may include one or more instances of a processor 312 and memory 314 that may be in communication with or otherwise control a device interface 320 and, in some cases, a user interface 330. As such, the processing circuitry 310 may be embodied as a circuit chip (e.g., an integrated circuit chip) configured (e.g., with hardware, software or a combination of hardware and software) to perform operations described herein. However, in some embodiments, the processing circuitry 310 may be embodied as a portion of an on-board computer. In some embodiments, the processing circuitry 310 may communicate with various components, entities and/or sensors of the ATG network 210.

The user interface 330 (if implemented) may be in communication with the processing circuitry 310 to receive an indication of a user input at the user interface 330 and/or to provide an audible, visual, mechanical or other output to the user. As such, the user interface 330 may include, for example, a display, one or more levers, switches, indicator lights, touchscreens, proximity devices, buttons or keys (e.g., function buttons), and/or other input/output mechanisms.

The device interface 320 may include one or more interface mechanisms for enabling communication with other devices (e.g., modules, entities, sensors and/or other components of the ATG network 210). In some cases, the device interface 320 may be any means such as a device or circuitry embodied in either hardware, or a combination of hardware and software that is configured to receive and/or transmit data from/to modules, entities, sensors and/or other components of the ATG network 210 that are in communication with the processing circuitry 310.

The processor 312 may be embodied in a number of different ways. For example, the processor 312 may be embodied as various processing means such as one or more of a microprocessor or other processing element, a coprocessor, a controller or various other computing or processing devices including integrated circuits such as, for example, an ASIC (application specific integrated circuit), an FPGA (field programmable gate array), or the like. In an example embodiment, the processor 312 may be configured to execute instructions stored in the memory 314 or otherwise accessible to the processor 312. As such, whether configured by hardware or by a combination of hardware and software, the processor 312 may represent an entity (e.g., physically embodied in circuitry—in the form of processing circuitry 310) capable of performing operations according to embodiments of the present invention while configured accordingly. Thus, for example, when the processor 312 is embodied as an ASIC, FPGA or the like, the processor 312 may be specifically configured hardware for conducting the operations described herein. Alternatively, as another example, when the processor 312 is embodied as an executor of software instructions, the instructions may specifically configure the processor 312 to perform the operations described herein.

In an example embodiment, the processor 312 (or the processing circuitry 310) may be embodied as, include or otherwise control the operation of the network controller 240 based on inputs received by the processing circuitry 310 responsive to receipt of position information associated with various relative positions of the communicating elements of the network. As such, in some embodiments, the processor 312 (or the processing circuitry 310) may be said to cause each of the operations described in connection with the network controller 240 in relation to adjustments to be made to network configuration relative to providing service between access points and mobile communication nodes responsive to execution of instructions or algorithms configuring the processor 312 (or processing circuitry 310) accordingly. In particular, the instructions may include instructions for processing 3D position information of the mobile communication nodes (e.g., on an aircraft) along with 2D position information of fixed transmission sites in order to provide control instructions for network assets. The control instructions may mitigate interference, conduct load balancing, implement antenna beamsteering, increase efficiency or otherwise improve network performance associated with establishing a communication link between the mobile communication nodes and respective ones of the fixed transmission stations or access points as described herein.

In an exemplary embodiment, the memory 314 may include one or more non-transitory memory devices such as, for example, volatile and/or non-volatile memory that may be either fixed or removable. The memory 314 may be configured to store information, data, applications, instructions or the like for enabling the processing circuitry 310 to carry out various functions in accordance with exemplary embodiments of the present invention. For example, the memory 314 could be configured to buffer input data for processing by the processor 312. Additionally or alternatively, the memory 314 could be configured to store instructions for execution by the processor 312. As yet another alternative, the memory 314 may include one or more databases that may store a variety of data sets responsive to input sensors and components. Among the contents of the memory 314, applications and/or instructions may be stored for execution by the processor 312 in order to carry out the functionality associated with each respective application/instruction. In some cases, the applications may include instructions for providing inputs to control operation of the network controller 240 as described herein.

In an example embodiment, the memory 314 may store fixed position information 350 indicative of a fixed geographic location of access points of the ATG network 210. In some embodiments, fixed position information 350 may be indicative of the fixed geographic location of multiple ones (or even all) of the access points of the ATG network 210. The fixed position information 350 may be read out of memory and provided to (and therefore also received at) the processing circuitry 310 for processing in accordance with an example embodiment.

The processing circuitry 310 may also be configured to receive dynamic position information 360 indicative of a three dimensional position and bearing of at least one mobile communication node (which should be appreciated to be capable of transmission and reception of signaling in connection with two way communication). In an example embodiment, the dynamic position information 360 may include latitude and longitude coordinates and altitude to provide a position in 3D space. In some cases, the dynamic position information 360 may further include heading and speed so that calculations can be made to determine, based on current location in 3D space, and the heading and speed (and perhaps also rate of change of altitude), a future location of the aircraft 110 at some future time. In some cases, flight plan information may also be used for predictive purposes to either prepare assets for future network control actions that are likely to be needed, or to provide planning for network asset management purposes.

The dynamic position information 360 may be determined by any suitable method, or using any suitable devices. For example, the dynamic position information 360 may be determined using global positioning system (GPS) information onboard the aircraft 110, using data from Automatic Dependent Surveillance-Broadcast (ADS-B) or other such systems, based on triangulation of aircraft position based on a direction from which a plurality of signals arrive at the aircraft 110 from respective ones of the access points, using aircraft altimeter information, using radar information, and/or the like, either alone or in combination with each other. The mobile communication node may be a passenger device onboard the aircraft 110, or may be a wireless communication device of the aircraft 110 itself. The wireless communication device of the aircraft 110 may transfer information to and from passenger devices (with or without intermediate storage), or may transfer information to and from other aircraft communications equipment (with or without intermediate storage).

In an example embodiment, the processing circuitry 310 may be configured to determine a relative position of the aircraft 110 (or multiple aircraft) relative to one or more of the access points (e.g., the first access point 200, second access point 202 or other APs) based on the fixed position information 350 and the dynamic position information 360. In other words, the processing circuitry 310 may be configured to utilize information indicative of the locations of two devices or network assets and determine where the network assets are relative to one another from the perspective of either one of the network assets (or both). Of note, while the "relative position" could take the form of a range and bearing from a particular reference point (e.g., an access point), the relative position need not be that specific in all cases. Instead, the relative position could be a determination of the nearest access point to the aircraft 110 based on the fixed position information 350 and the dynamic position information 360. Additionally or alternatively, the relative position could be a determination of the access points that are within communication range (i.e., which access points are relatively close to the aircraft 110). In some embodiments, such determination may further include ranking the access points based on current distance (or signal strength) and/or based on estimates of future distance (or signal strength) based on a predicted future position of the aircraft 110 (and nodes thereon).

Accordingly, in some embodiments, tracking algorithms may be employed to track dynamic position changes and/or calculate future positions based on current location and rate and direction of movement. Thus, the relative position may, in some cases, be a predicted future position as mentioned above. The network controller 240 may therefore not only be able to determine the best one or more access points for the nodes of the aircraft 110 to connect to at any given point along the route 120, but the network controller 240 may also determine the access points that are likely to be the best access points for connection in the future for a predetermined period of time or even for the entire route. Thus, for example, the network controller 240 may be configured to determine a route communication plan that may define the access points to contact along the route 120 and corresponding times or locations for which the respective access points are the best access points. In some cases, an FAA flight plan may be used to determine the route communication plan. Alternatively or additionally, the network controller 240 may estimate the route communication plan on the basis of information entered by the flight crew and/or historical information. Accordingly, for example, the route communication plan may provide a list of access point identifiers for which the nodes of the aircraft 110 should listen as each respective cell is approached so that handovers can be handled more easily and efficiently. Thus, the nodes can avoid or mitigate interference impacts by focusing in on a particular frequency or channel that is known in advance by looking for a particular access point identifier at a particular time when it is known that the access point identifier should be within or close to within range.

Knowledge of which cells are close (and which cells are farther away) can also be used for further efficient operation of the ATG network 210. For example, if some cells are known to not have any aircraft 110 therein, and perhaps also if there are no scheduled routes passing therethrough for a predetermined time, power may be secured for those cells or transmission power may be lowered to a minimum level. When an aircraft route is scheduled to approach the cell, power may be restored or increased. Similarly, if an aircraft route is scheduled to pass near a cell edge of a particular cell, the network controller 240 may determine whether it would be preferable to have the corresponding access point decrease transmission power (or secure transmitting at particular frequencies or on certain channels) to avoid interference, or whether the corresponding access point should actually increase transmission power to be able to provide access to nodes on the aircraft 110. For example, if another adjacent cell that is proximate to the route is currently heavily loaded with traffic, the network controller 240 may balance the load in the network by asking the access point of the particular cell to increase power and/or pick up connectivity provision for a new aircraft moving proximate to the cell edge of the particular cell. Thus, control of cells that are proximate to a route (but not necessary for connectivity on the route due to other proximate cells being capable of providing connectivity if preferred) can be provided for interference mitigation or load balancing considerations.

In an example embodiment, since the network controller 240 is capable of knowing the location of every aircraft (and perhaps every mobile communication node) in the network, the network controller 240 may be enabled to determine which access points are heavily loaded at any given time, or which access points are likely to experience interference from adjacent access points. The network controller 240 may therefore receive or generate information indicative of network loading and network interference and make control instructions to handle or alleviate issues relating to interference and network loading. In an example embodiment, the network controller 240 may include parametric guidelines stored thereat to define specific parameters that are acceptable, and other parameters for which, when experienced or predicted to occur, the network controller 240 is configured to cause corresponding positive actions to be directed to alleviate conditions causing such parameters.

In some embodiments, the network controller 240 may classify cells relative to each aircraft 110 or each aircraft route. For example, cells may be classified as primary cells if the route 120 passes through a central portion of the cell. Meanwhile, cells may be classified as secondary or proximal cells if the route 120 passes through only an edge portion of the corresponding cells. Finally, cells may be classified as remote cells if the route 120 does not pass through or next to the cells. As can be appreciated from the discussion above, classifications of primary, secondary and remote cells or otherwise can be handled on a real time basis, or may be managed for the whole route or at least a predetermined advanced portion of a route in some alternatives when the network controller 240 engages in route communication planning.

Regardless of whether the management is conducted in real time, or includes future planning, the network controller 240 may be configured to provide instructions to cells on a group basis. Thus, for example, one or more primary cells may be instructed to communicate on certain channels or frequencies with respective nodes of the aircraft 110 (currently or for predetermined periods of future times). Alternatively or additionally, transmission power levels or antenna radiation patterns of the primary cells may be adjusted by the network controller 240 to further facilitate communication with the nodes. Secondary cells may be selectively instructed to lower transmission power (or stop transmitting on certain frequencies or channels) or adjust antenna radiation patterns to avoid interference either in real time or during predetermined future times. Some of the secondary cells may alternatively or additionally be selectively instructed to increase transmission power (or begin transmitting on certain frequencies or channels) in order to pick up the nodes on the aircraft 110 to assist with load balancing. Meanwhile, remote cells may be have power secured or reduced, or may have certain channel or frequency restrictions imposed to avoid interference and improve network efficiency. Accordingly, it should be appreciated that the network controller 240 may be configured to provide instructions to differently classified blocks of cells based on the proximity of the blocks of cells to an aircraft or a route of the aircraft in real time or in advance.

As an alternative to the paradigm of route communication planning, the network controller 240 may manage network assets (e.g., access points and aircraft nodes) from the perspective of the cells. Thus, for example, a cell management plan may include the projected times and/or locations of aircraft that will pass through or near each cell. The cells may then be managed by the network controller 240 accordingly for each respective time period for which a classification or instruction from the network controller 240 dictates operation of the cells in a particular way. Regardless of the paradigm, the network controller 240 may be configured to receive the dynamic position information 360 relating to one or more aircraft and determine a relative position of the one or more aircraft to fixed access point locations within the network. Based on the relative position determination(s), the network controller 240 may be configured to further provide network control instructions to network assets (e.g., access points and aircraft nodes) to conduct load balancing, implement antenna beamsteering, interference mitigation and/or improved network efficiency and security.

In some example embodiments, the network controller 240 may further be configured to operate in a mesh network context. For example, the network controller 240 may be configured to utilize dynamic position information associated with multiple aircraft in order to form mesh communication links between aircraft. Thus, for example, one aircraft could relay information to another aircraft from a terrestrial base station. In such an example, the relative position may be a relative position between two aircraft. In some embodiments, multiple "hops" between aircraft may be accomplished to reach remotely located aircraft, or even to provide self healing in a network where a particular ground station is not operating, but there are other aircraft in the area that can relay information to fill in the coverage gaps left by the non-operating ground station.

Figure 4:
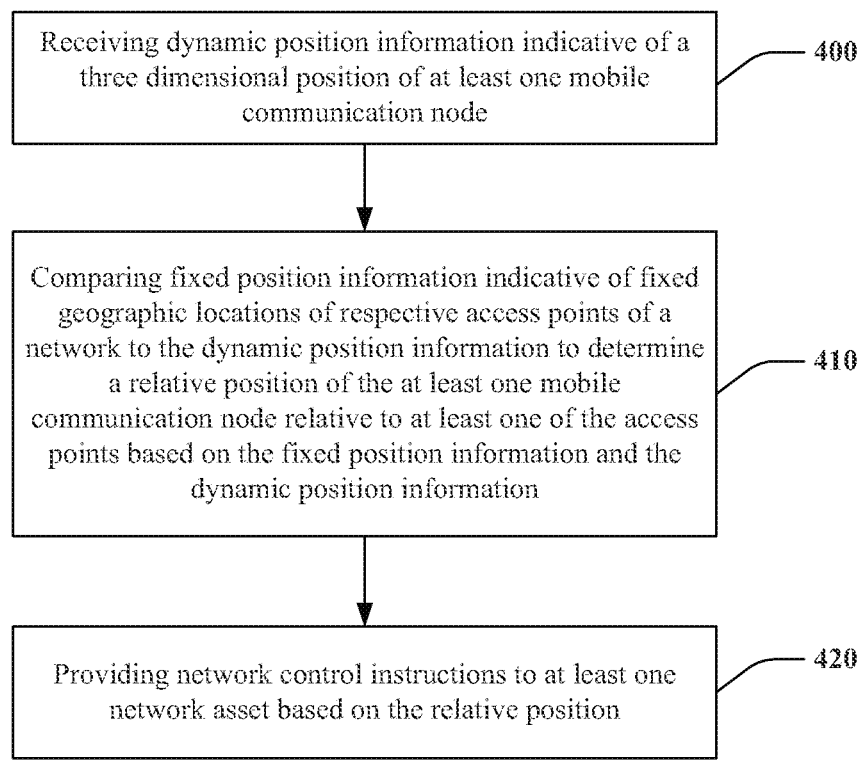
FIG. 4 illustrates a block diagram of a method for employing positional information for assisting with network control functions in accordance with an example embodiment.

As such, the system of FIG. 2 may provide an environment in which the network controller 240 of FIG. 3 may provide a mechanism via which a number of useful methods may be practiced. FIG. 4 illustrates a block diagram of one method that may be associated with the system of FIG. 2 and the network controller 240 of FIG. 3. From a technical perspective, the network controller 240 described above may be used to support some or all of the operations described in FIG. 4. As such, the platform described in FIG. 2 may be used to facilitate the implementation of several computer program and/or network communication based interactions. As an example, FIG. 4 is a flowchart of a method and program product according to an example embodiment of the invention. It will be understood that each block of the flowchart, and combinations of blocks in the flowchart, may be implemented by various means, such as hardware, firmware, processor, circuitry and/or other device associated with execution of software including one or more computer program instructions. For example, one or more of the procedures described above may be embodied by computer program instructions. In this regard, the computer program instructions which embody the procedures described above may be stored by a memory device (e.g., the network controller 240) and executed by a processor in the device. As will be appreciated, any such computer program instructions may be loaded onto a computer or other programmable apparatus (e.g., hardware) to produce a machine, such that the instructions which execute on the computer or other programmable apparatus create means for implementing the functions specified in the flowchart block(s). These computer program instructions may also be stored in a computer-readable memory that may direct a computer or other programmable apparatus to function in a particular manner, such that the instructions stored in the computer-readable memory produce an article of manufacture which implements the functions specified in the flowchart block(s). The computer program instructions may also be loaded onto a computer or other programmable apparatus to cause a series of operations to be performed on the computer or other programmable apparatus to produce a computer-implemented process such that the instructions which execute on the computer or other programmable apparatus implement the functions specified in the flowchart block(s).

Accordingly, blocks of the flowchart support combinations of means for performing the specified functions and combinations of operations for performing the specified functions. It will also be understood that one or more blocks of the flowchart, and combinations of blocks in the flowchart, can be implemented by special purpose hardware-based computer systems which perform the specified functions, or combinations of special purpose hardware and computer instructions.

In this regard, a method according to one embodiment of the invention, as shown in FIG. 4, may include receiving dynamic position information indicative of a three dimensional position of at least one mobile communication node at operation 400 and comparing fixed position information indicative of fixed geographic locations of respective access points of a network to the dynamic position information to determine a relative position of the at least one mobile communication node relative to at least one of the access points based on the fixed position information and the dynamic position information at operation 410. In some embodiments, the method may further include providing network control instructions to at least one network asset based on the relative position at operation 420.

In some embodiments, the method may include additional, optional operations, and/or the operations described above may be modified or augmented. Some examples of modifications, optional operations and augmentations are described below. It should be appreciated that the modifications, optional operations and augmentations may each be added alone, or they may be added cumulatively in any desirable combination. In an example embodiment, the dynamic position information may include latitude and longitude coordinates and altitude of an aircraft. In an example embodiment, the at least one network asset may be one of the access points. In some cases, the method may further include receiving information indicative of network loading, and providing the network control instruction may include providing the network control instruction based on the relative position and the information indicative of network loading. In such an embodiment, providing the network control instruction may include instructing the at least one of the access points to reduce transmission power. In an example embodiment, providing the network control instruction may include instructing the at least one of the access points to secure power or form and/or steer a beam for enhanced connectivity with a mobile node. In some cases, providing the network control instruction may include instructing the at least one of the access points to avoid transmission at a frequency or channel employed by the at least one mobile communication node. In some embodiments, providing the network control instruction may include instructing the at least one of the access points to conduct a handover of the at least one mobile communication node to a different access point. Moreover, in some embodiments, additional network security mechanisms may be employed. For example, alternative encryption schemes may be applied either selectively (e.g., based on position along a flight path) or for the entirety of a particular flight path.

In an example embodiment, the method may further include receiving information indicative of network interference, and providing the network control instruction may include providing the network control instruction based on the relative position and the information indicative of network interference. In such an embodiment, providing the network control instruction may include instructing the at least one of the access points to reduce transmission power. In some cases, providing the network control instruction may include instructing the at least one of the access points to secure power. In some embodiments, providing the network control instruction may include instructing the at least one of the access points to avoid transmission at a frequency or channel employed by the at least one mobile communication node.

In an example embodiment, the at least one network asset may be associated with the least one mobile communication node. In some cases, providing the network control instruction comprises instructing the least one mobile communication node to communicate with an access point associated with a specific identifier where the access point associated with the specific identifier is determined on the basis of information indicative of network interference or network loading. In some embodiments, the relative position may include an expected relative position corresponding to a future mobile communication node position and indicating an estimated time at which the mobile communication node will be at the future mobile communication node position. In an example embodiment, the dynamic position information may be determined at least in part using global positioning system (GPS) information, Automatic Dependent Surveillance-Broadcast (ADSB) or other such systems provided by the mobile communication node, or may be determined based on triangulation of aircraft position based on a direction from which a plurality of signals arrive at the aircraft from respective ones of the access points, or may be determined using aircraft altimeter information or radar information. In some embodiments, the network controller is configured to receive dynamic position information for a plurality of aircraft, and to provide expected relative position information for multiple aircraft relative to corresponding access points of the network.

In some embodiments, the network controller may be configured to classify access points in groups based on proximity to a route of an aircraft. In such an embodiment, respective common network control instructions may be provided to the groups to configure the network on a group-wise basis. In some embodiments, the network controller may store parametric guidelines defining at least interference related parameters or load balancing parameters that are used for or otherwise act as triggers for causing the network controller to issue the network control instructions.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

What is claimed is:

1. A network controller comprising processing circuitry configured to:
   determine predicted future positions of a mobile communication node based on dynamic position information indicative of a three dimensional position of the mobile communication node moving between cells of an air to ground network;
   determine, for predetermined periods of time corresponding to the predicted future positions, selected ones of the cells that are expected to be within communication range of the mobile communication node; and
   provide network control instructions to some of the selected ones of the cells to pick up the mobile communication node during the respective ones of the predetermined periods of time,
   wherein providing the network control instruction comprises instructing the selected ones of the cells to adjust antenna radiation characteristics at the respective ones of the predetermined periods of time.

2. The network controller of claim 1, wherein the processing circuitry is further configured to provide instructions to others of the selected ones of the cells to reduce power during the respective ones of the predetermined periods of time to reduce interference.

3. The network controller of claim 1, wherein the processing circuitry is further configured to provide instructions to the some of the selected ones of the cells to increase power during the respective ones of the predetermined periods of time to facilitate connectivity to the mobile communication node.

4. The network controller of claim 1, wherein the processing circuitry is further configured to classify the selected ones of the cells in groups based on a degree to which a route of the mobile communication node passes through each of the selected ones of the cells, and wherein respective network control instructions are provided to each of the selected ones of the cells in a respective one of the groups.

5. The network controller of claim 1, wherein adjusting antenna radiation characteristics comprises performing antenna beamsteering toward the mobile communication node.

6. The network controller of claim 5, further comprising providing instructions to adjust antenna radiation characteristics of the mobile communication node to perform antenna beamsteering from the mobile communication node.

7. The network controller of claim 1, wherein providing the network control instructions comprises providing, for each of the respective ones of the predetermined periods of time, a list of cell identifiers for which the mobile communication node is directed to listen to facilitate a handover to a corresponding cell in the list of cell identifiers at a given time in the future.

8. The network controller of claim 1, wherein providing the network control instructions comprises providing a route communication plan defining a channel or frequency expected to be detected at a given time in the future.

9. The network controller of claim 1, wherein providing the network control instructions comprises providing a route communication plan defining a best cell at each of the respective ones of the predetermined periods of time for a duration of a route of the mobile communication node.

10. The network controller of claim 1, wherein providing the network control instructions comprises providing a route communication plan defining a best cell at each of a plurality of future locations of the mobile communication node for a duration of a route of the mobile communication node.

11. The network controller of claim 1, wherein providing the network control instructions comprises providing parametric guidelines defining a list of parameters and corresponding actions to be taken when the parameters are experienced.

12. The network controller of claim 1, wherein providing the network control instructions comprises providing parametric guidelines defining a list of parameters and corresponding actions to be taken when the parameters are expected to occur at a future time.

13. The network controller of claim 1, wherein the processing circuitry is further configured to provide instructions to non-selected cells to secure power.

14. The network controller of claim 1, wherein providing the network control instruction comprises instructing the selected ones of the cells to alter encryption algorithms.

15. The network controller of claim 1, wherein providing the network control instruction comprises instructing changes to coding or modulation schemes.

16. A system comprising a plurality of cells of an air to ground network, a mobile communication node, and a network controller comprising processing circuitry, the processing circuitry being configured to:
- determine predicted future positions of a mobile communication node based on dynamic position information indicative of a three dimensional position of the mobile communication node moving between cells of an air to ground network;
- determine, for predetermined periods of time corresponding to the predicted future positions, selected ones of the cells that are expected to be within communication range of the mobile communication node; and
- provide network control instructions to instruct the selected ones of the cells to adjust antenna radiation characteristics at the respective ones of the predetermined periods of time.

17. The system of claim 16, wherein providing the network control instructions comprises providing an identifier of a best cell at each of the respective ones of the predetermined periods of time for a duration of a route of the mobile communication node based on the estimate of future interference and the respective expected loading.

18. The system of claim 16, wherein providing the network control instructions is performed in advance of the respective ones of the predetermined periods of time.

19. The system of claims 16, wherein the selected ones of the cells are determined based on ranking the cells based on estimates of future distance to the mobile communication node or future signal strength received at the mobile communication node.

20. The system of claim 16, wherein adjusting antenna radiation characteristics comprises performing antenna beamsteering toward the mobile communication node.

* * * * *